Feb. 18, 1936. S. B. HASELTINE 2,031,039
REFRIGERATOR CAR DOOR
Filed June 23, 1934 6 Sheets-Sheet 1
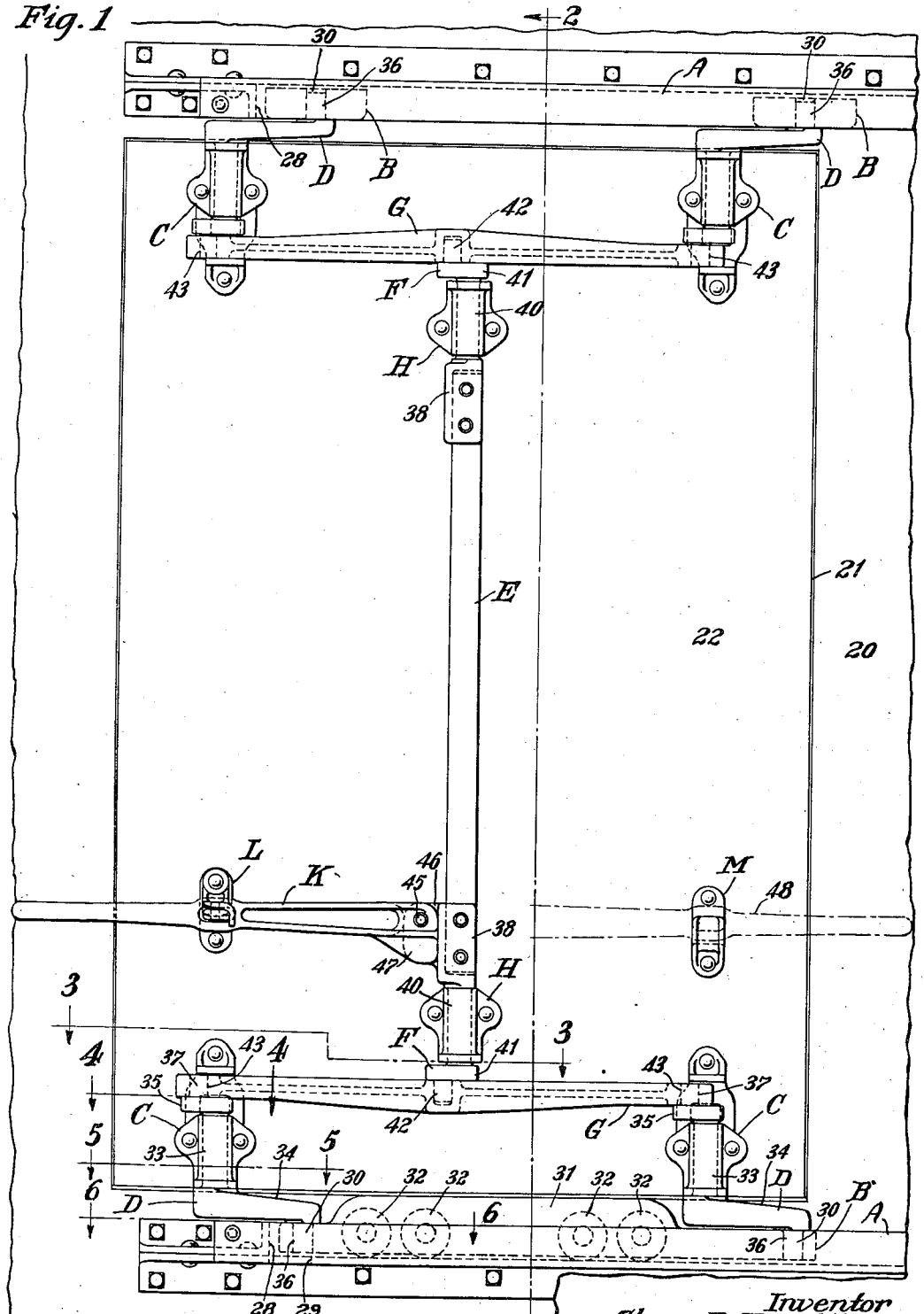
Inventor
Stacy B. Haseltine
By Henry Fuchs Atty.

Feb. 18, 1936.  S. B. HASELTINE  2,031,039
REFRIGERATOR CAR DOOR
Filed June 23, 1934  6 Sheets-Sheet 2
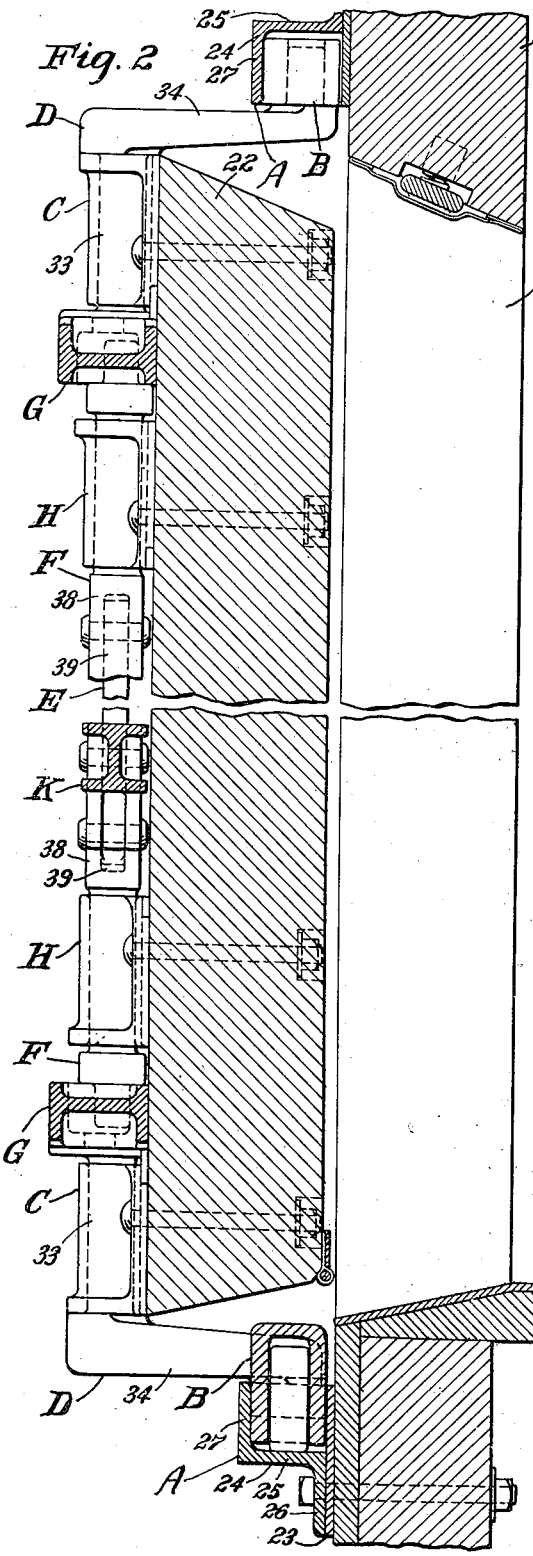
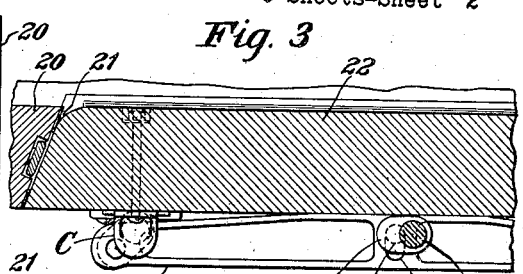
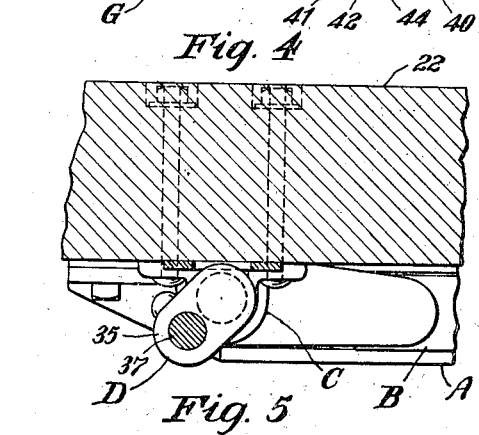
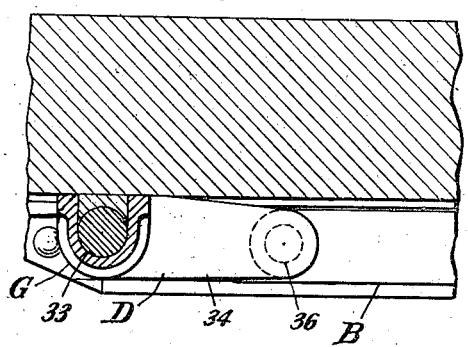
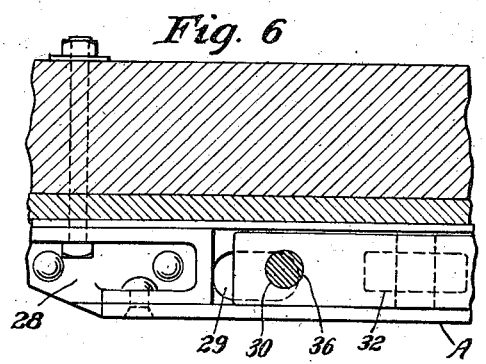
Inventor
Stacy B. Haseltine
By Henry Fuchs Atty.

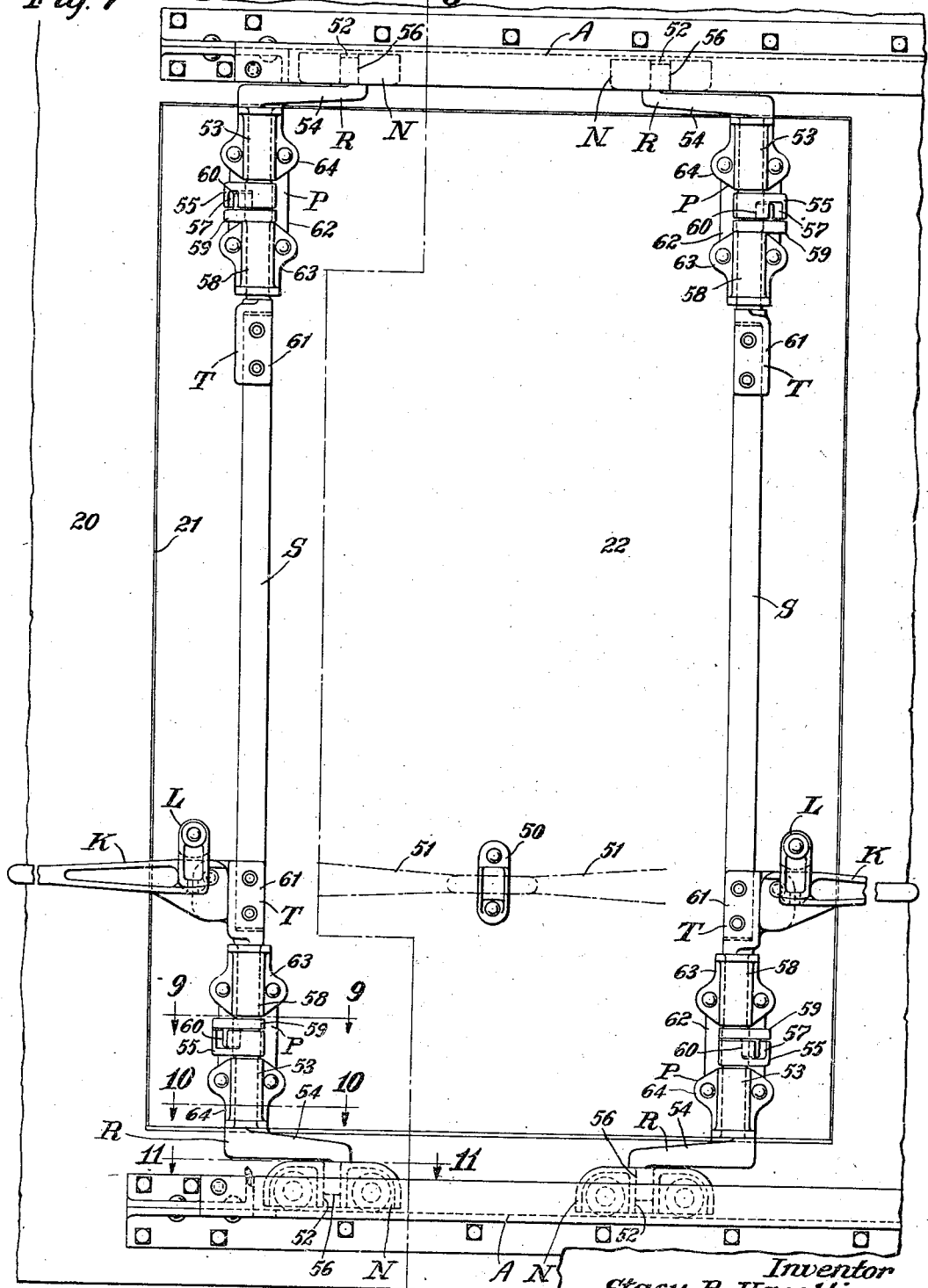

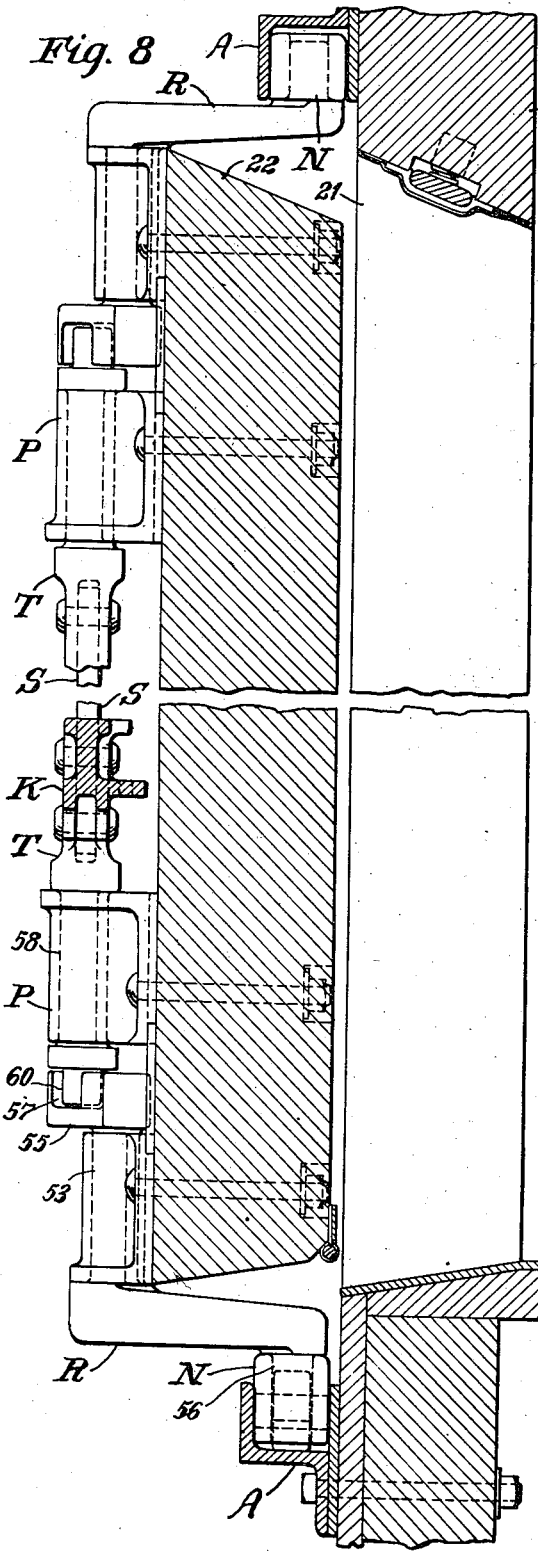
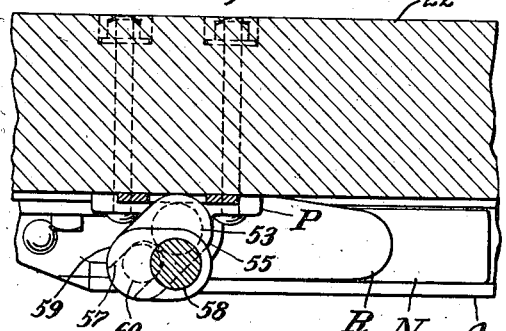
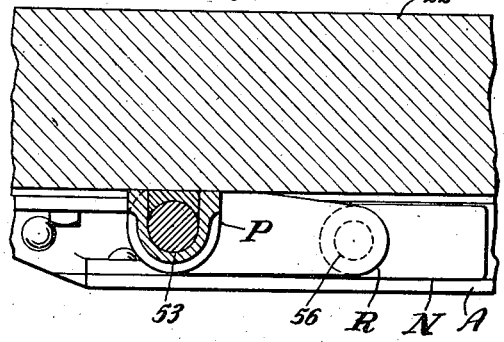
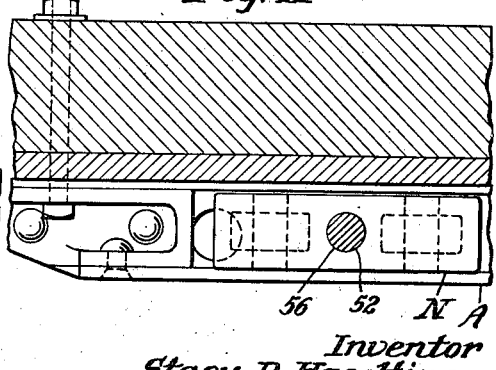

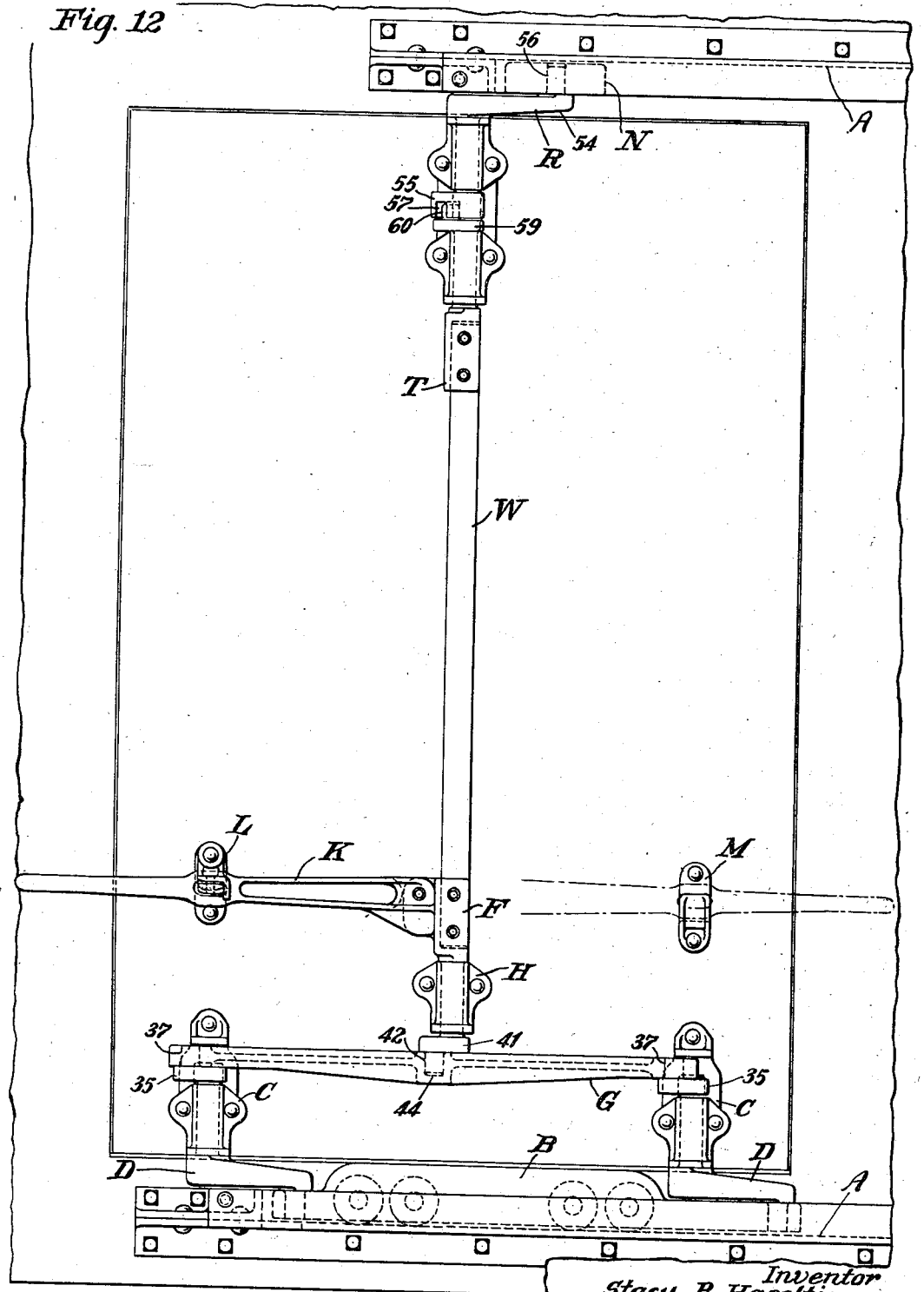

Feb. 18, 1936.  S. B. HASELTINE  2,031,039
REFRIGERATOR CAR DOOR
Filed June 23, 1934  6 Sheets-Sheet 6
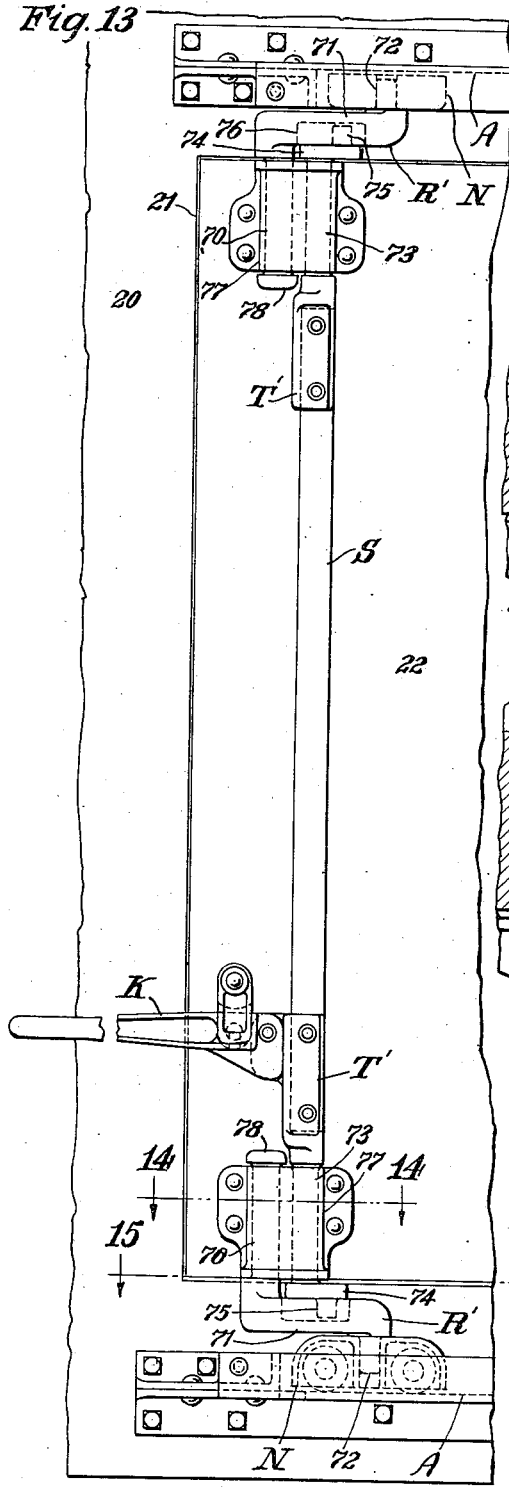
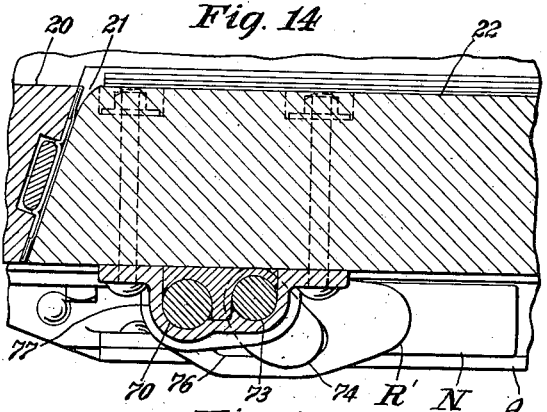
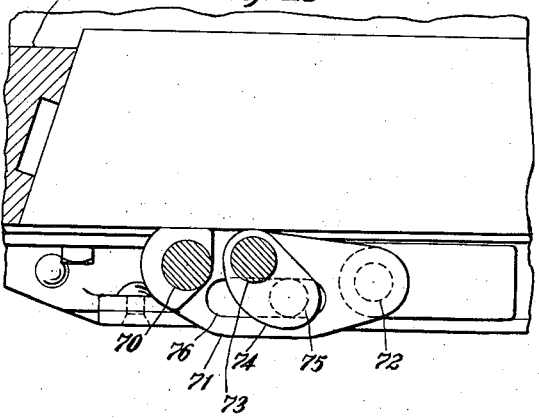
Inventor
Stacy B. Haseltine
By Henry Fuchs Atty.

Patented Feb. 18, 1936

2,031,039

UNITED STATES PATENT OFFICE 2,031,039

REFRIGERATOR CAR DOOR

Stacy B. Haseltine, Chicago, Ill., assignor to W. H. Miner, Inc., Chicago, Ill., a corporation of Delaware Application June 23, 1934, Serial No. 732,015

27 Claims. (Cl. 20—23)

This invention relates to improvements in refrigerator car doors.

One object of the invention is to provide a door construction for refrigerator cars comprising a single sliding door member for closing the door opening of the car, wherein simple and efficient actuating means is employed for either moving the door into the door opening and forcing it tightly closed, or prying the same partly open and moving it to fully opened position, the actuating means being so arranged and designed that the projection of the operating parts thereof will not exceed certain predescribed limits, so that the mechanism will clear the usual loading platform structures and all other obstructions encountered in standard railway practice.

A further object of the invention is to provide a simple and efficient actuating means of rugged design for door constructions of the character specified in the preceding paragraph, wherein the door is supported by swinging crank arms which are journaled on the door and have their crank pin ends rotatably mounted in carriers slidable in tracks commonly employed in connection with single door members, and the crank arms are oscillated by rotary operating means, connected to the crank arms in such a manner that the latter are swung through an arc of less angularity than the arc of rotary movement of the operating means during the door closing and opening operations, and the power applied to the crank arms is greatly increased during the final closing and initial opening movements of the door.

A more specific object of the invention is to provide an exceedingly simple, efficient and rugged connected operating and actuating means of the character set forth in the preceding paragraph by employing operating and actuating members which are mounted for rotation on axes fixed with respect to each other, and employing a lost motion driving connection between the operating and actuating members in the form of a crank element rotatable with one of said members and having the crank pin thereof working in a slotted element which is in driving relation with the other member.

Other objects of the invention will more clearly appear from the description and claims hereinafter following.

In the drawings forming a part of this specification, Figure 1 is an elevational view, partly broken away, of the side wall of a refrigerator car, illustrating my improvements in connection therewith, said view showing the door closed. Figure 2 is a vertical sectional view, partly broken away, on an enlarged scale, corresponding substantially to the line 2—2 of Figure 1, but showing the door withdrawn from the door opening. Figure 3 is a horizontal sectional view, partly broken away, corresponding substantially to the line 3—3 of Figure 1. Figures 4, 5, and 6 are horizontal sectional views, on an enlarged scale, corresponding respectively to the lines 4—4, 5—5, and 6—6 of Figure 1, said views being partly broken away. Figure 7 is a view similar to Figure 1, illustrating another embodiment of the invention. Figure 8 is a vertical sectional view, partly broken away, on an enlarged scale, corresponding substantially to the line 8—8 of Figure 7. Figures 9, 10, and 11 are horizontal sectional views, on an enlarged scale, corresponding respectively to the lines 9—9, 10—10, and 11—11 of Figure 7, said views being partly broken away. Figure 12 is a view similar to Figure 1, illustrating still another embodiment of the invention. Figure 13 is a view similar to Figure 1, showing one end portion only of the door, and illustrating still another embodiment of the invention. Figures 14 and 15 are horizontal sectional views, on an enlarged scale, corresponding respectively to the lines 14—14 and 15—15 of Figure 13.

In said drawings, 20 indicates the side wall of the car, which side wall is provided with the usual door opening 21 closed by a single door 22. The meeting edges of the door and door opening are beveled as is common in connection with the doors of refrigerator cars, and said beveled edges are provided with the usual packing material in order to provide a tight seal when the door is closed.

In carrying out my invention, as disclosed in Figures 1 to 6 inclusive, I provide top and bottom tracks A—A; carriers B—B and B cooperating with the top and bottom tracks A—A; pairs of top and bottom combined supporting and journal brackets C—C and C—C; pairs of top and bottom crank members D—D and D—D; a vertically disposed operating shaft or bar E; end castings F—F on the bar E; top and bottom connecting rods or bars G—G operatively joining the crank members D—D and D—D to the end members F—F of the bar E; journal brackets H—H rotatably supporting the bar E; an operating handle lever K; a locking member L for holding the lever K in one position; and a locking latch bracket M for holding the lever in another position.

The tracks A—A above and below the door opening are of the same design but reversely arranged, that is, the bottom track opens upwardly while the upper track opens downwardly. Each track A comprises a longitudinally extending, vertically disposed bar 23 and a longitudinally extending bar 24 having a central horizontal section 25 provided with inner and outer reversely extending vertical flanges 26 and 27 at opposite ends thereof. The flange 26 bears on the bar 23 and both of the bars 23 and 24 are secured to the side wall 20 of the car by means of bolts or any other well known securing means extending through said side wall, through the bar 23, and the flange 26 of the bar 24. The flange 27 of the bar 24 is spaced from the corresponding section of the bar 23, thereby providing a guide trough or way therebetween within which the corresponding carriers B—B are slidable. As most clearly shown in Figures 1 and 6, a stop casting 28 is provided at the left hand end of each track A. The stop casting is riveted to the bars 23 and 24, which form the track A, and has the part thereof, which forms the stop, extending between the side walls of the guideway of the track. The bottom wall of the lower track A is preferably provided with one or more drain openings 29, as shown in Figure 6.

The top carriers B—B are of like design, each being in the form of a block slidably accommodated between the side walls of the upper guide track A and having a central journal opening 30 therein adapted to accommodate a bearing member of the corresponding crank member D, hereinafter more fully described. The carrier B, which cooperates with the lower track A, is in the form of an elongated casting having a central vertical enlarged section 31 within which anti-friction rollers 32—32 and 32—32 are carried. At opposite ends the carrier casting B of the lower track is provided with vertically disposed journal openings 30—30, similar to the bearing openings 30—30 of the upper carriers B—B. By employing a single carrier B at the bottom of the door, a decided advantage is obtained over designs in which separate carriers are employed at opposite ends of the door, in that the central section of the carrier may be of greater height than the end portions, thereby permitting the use of larger anti-friction rollers and also making it possible to place the track closer to the lower edge of the door and door opening.

The crank members by which the door 22 is supported are preferably four in number and are arranged in top and bottom pairs D—D and D—D. Each crank member D comprises a relatively short shaft section 33 having a relatively long, radially extending crank arm 34 at the outer end and a relatively shorter, radially extending crank arm 35 at the inner end. The crank arm 34 is provided with a crank pin 36 at its outer end which is journaled in the corresponding opening 30 of one of the carriers B. The inner crank arm 35 is also provided with a crank pin 37 at the outer end thereof. Each crank member D is rotatably supported in a bearing bracket C which is secured to the door 22. Each bracket C is composed of front and rear sections having cooperating partial bearing openings which embrace the shaft section 33 of the corresponding crank member D. As most clearly illustrated in Figure 1, the crank members D—D at the top of the door and the crank members D—D at the bottom thereof are located at opposite ends of the door, each crank member being supported by one of the journal brackets C. The crank pins 36 of the two upper crank members D—D engage within the bearing openings 30—30 of the upper carriers B—B and the crank pins 36—36 of the lower crank members D—D engage within the bearing openings 30—30 at opposite ends of the carrier B which cooperates with the bottom track A.

The operating shaft E is in the form of a substantially flat bar and has the end castings F—F fixed thereto by rivets or any other suitable securing means. The end castings F—F are of like design, each having an inner end section 38 provided with a socket 39 within which the corresponding end of the bar E is secured. Adjacent to the section 38, each end casting F has a cylindrical shaft section 40 which is journaled in the corresponding two-part bearing bracket H. At the end opposite to the section 38, the end casting F is provided with a crank arm 41 having a crank pin 42 at the outer end thereof. The end castings F—F are reversely arranged, as clearly shown in Figures 1 and 2.

The connecting bars G—G are disposed at the top and bottom of the door and serve to operatively join the bar E and the corresponding crank members D—D. Each bar G has vertically disposed bearing openings 43—43 at opposite ends thereof, within which the crank pins 37—37 of the corresponding crank members D—D are accommodated. Midway between its ends, each bar G is provided with a slot 44 which extends at right angles to the longitudinal axis of the bar. The slot 44 serves as a guideway which accommodates the crank pin 42 of the corresponding end casting F of the operating bar E.

The bar E is rotated about its vertical axis by means of the lever K, which is pivoted to the end casting F at the lower end of the bar E by means of a pivot pin 45. In order to pivotally support the lever K, the end casting F is preferably provided with a laterally extending flange or web 46 which is embraced by the forked end section 47 of the lever K.

The locking member L is mounted on the door at one side of the bar E and a latch bracket M is secured to the door at the other side of said bar E, as clearly shown in Figure 1. The locking member L is of well known type used in connection with door operating handle levers of refrigerator cars and needs no further description. The latch bracket M may be of any well known type having an upstanding flange or tongue thereon, in back of which the arm of the lever K may be engaged. The pivotal connection 45 of the lever K with the lower end casting F serves the purpose of permitting sufficient upward movement of the lever to engage the same in back of the locking flange of the latch bracket M.

The operation of the mechanism illustrated in Figures 1 to 6 inclusive is as follows, assuming that the door is in the closed position shown in Figure 1:

The operator unlocks the latching means L so as to permit full outward swinging movement of the lever K and then manually swings the lever outwardly, thereby rotating the bar E. During the rotation of the bar E, the crank arms 41—41 of the end castings F—F will be rotated, thereby swinging the bars G—G in a lengthwise direction while the crank pins 42—42 of the crank arms 41—41 are also traveling in the slots 44—44 of the bars G—G. A lost motion connection is thus provided between the crank arms 41—41 of the end members F—F and the bars G—G through movement of the crank pins in the slots 44—44 of the bars. Inasmuch as the opposite ends of the bars G—G are connected to the crank pins of the crank arms 35—35 at the inner ends of the crank members D—D, the crank members will be rotated in unison with the operation of the bar E, thereby swinging the door outwardly away from the side wall of the car and moving the door out of the door opening. When the bar E has been rotated to an angle of 180 degrees, that is, when the operating lever K assumes the dotted line position shown at 48, the door will have reached the fully opened position shown in Figure 2 and is spaced a proper distance from the outer surface of the side wall of the car to permit sliding the door lengthwise away from the door opening. In order to avoid accidental displacement of the door during such sliding movement, the operator engages the handle of the lever K in back of the flange of the latch bracket M.

As will be evident upon reference to Figure 3, the operating mechanism is so designed that the power of the rotary operating bar E will be greatly multiplied during the initial portion of the operation of forcing the door open. The crank arms 41—41 of the top and bottom end castings F—F are disposed substantially parallel to the length of the connecting bars G—G when the door is in the fully closed position, so that the crank pins 42—42 of the crank arms 41—41 will travel outwardly in the slots 44—44 of the bars G—G when the door opening operation is initiated. As will be evident, great power multiplication is thus effected during this stage of the operation. A further advantage which is obtained by providing the lost motion connection between the bar E and the connecting bars G—G, by means of the crank pins 42—42 working in the slots 44—44 of the bars G—G, is that the crank members D—D and D—D will be rotated or oscillated through an arc which is less than the angular rotation of the bar E while the lever is swung from the full line position shown in Figure 1 to the dotted line position indicated by 48. By providing this motion reducing mechanism, a decided advantage is obtained in that crank members D—D of sufficient length to assure proper opening of the door may be employed without requiring movement of the crank members through an angle of 180 degrees, which corresponds to the angular rotation of the operating bar E. An objectional defect in connection with former devices in which the crank arms were designed to open the door while being rotated through an angle of 180 degrees is that the tracks and supporting carriers must be placed at such a distance from the side wall of the car that the projection thereof interferes with the usual loading platforms and other obstructions encountered in standard railway practice.

In closing the door, the operation is substantially the reverse of that hereinbefore described, the door being first slid in front of the door opening is then forced into the door opening by rotating the operating bar E through movement of the lever from the dotted line position shown in Figure 1 to its full line position. Through the rotation of the operating bar E, the connecting bars are moved in a direction reverse to that hereinbefore described, thereby swinging the crank members D—D and D—D in the proper direction to move the door to the fully closed position shown in Figures 1, 3, 4, 5, and 6. Inasmuch as the crank pins 42—42 of the crank arms 41—41 of the castings F—F travel in the slots 44—44 of the bars G—G during the final closing movement of the door, the power is greatly multiplied and the door forced tightly into the door opening.

Referring next to the embodiment of the invention, illustrated in Figures 7 to 11 inclusive, A—A indicates top and bottom tracks identical with the tracks A described in connection with Figures 1 to 6 inclusive. My improved construction, as shown in Figures 7 to 11 inclusive, comprises top and bottom sets of carriers N—N and N—N cooperating respectively with the upper and lower guide tracks A—A; top and bottom pairs of journal bearing brackets P—P and P—P; top and bottom sets of crank members R—R and R—R; a pair of operating bars S—S; end castings T—T and T—T on the operating bars; and lever means for rotating each bar.

The lever means for rotating each bar S comprises a lever arm, which is identical with the lever arm K hereinbefore described, and is also indicated by K. The lever arm K is pivoted to the lower end member T of each bar S in a manner similar to the lever K described in connection with Figures 1 to 6 inclusive.

The lever K of each bar S is locked in one position, which is shown in full lines in Figure 7, by means of the locking member L, which is identical with the locking member L of Figure 1. A latch bracket 50, which is of the same general design as the latch bracket M hereinbefore described, is located centrally between the two operating bars S—S and is adapted to receive the outer ends of both of the levers K when they are swung to the dotted line positions 51—51 in Figure 7. The carriers N—N which engage within the guideway of the upper track A are identical with the upper carriers B—B described in connection with Figures 1 to 6 inclusive. The lower carriers N—N which cooperate with the bottom track A are in the form of blocks which are slidable within the guideway of said track. Each carrier N is supported by a pair of anti-friction rollers which are journaled in suitable openings provided in the carrier. Between the rollers, each carrier is provided with a vertically disposed bearing opening 52 adapted to receive the crank pin of the corresponding crank member R. The carriers N—N, which cooperate with the upper track A, are provided with similar bearing openings 52—52. The crank members R—R are of similar design, each having a vertically disposed shaft section 53 provided with a radially extending crank arm 54 at the outer end and a relatively shorter crank arm 55 at the inner end. The crank arm 54 of each crank member R has a crank pin 56 at the outer end which is journaled in the opening 52 of the corresponding carrier N. The inner crank arm 55 of each crank member R is provided with a substantially radially extending slot 57 at its outer end adapted to cooperate with a crank pin at the outer end of the corresponding end casting T.

The end castings T—T and T—T are arranged in pairs at opposite ends of the operating bars S—S. Each end casting T has a vertically disposed shaft section 58 having a crank arm 59 at its outer end provided with a crank pin 60 which engages within the slot 57 of the corresponding crank member R. At the inner end of the shaft section 58, each end casting is provided with a socketed section 61, which receives the corresponding end of the one of the operating bars S. The end castings and the operating bars S are secured together in the same manner as the corresponding elements described in connection with Figures 1 to 6 inclusive.

Four supporting brackets P—P and P—P are provided on the door 22 for rotatably supporting the operating bars S—S and the crank members R—R and R—R. Each supporting bracket P comprises a rear plate section 62 and two spaced front sections 63 and 64. The plate 62 and the plate sections 63 and 64 have opposed partial bearing faces which form complete bearing members embracing the shaft section 58 of the corresponding end member T and the shaft section 53 of the corresponding crank member R.

The operation of my improved mechanism as shown in Figures 7 to 11 inclusive is as follows, assuming that the door is in the closed position shown in Figure 7:

The operating bars are released from the latch bracket 50 and rotated to swing the handles K from the full line positions shown in Figure 7 to the dotted line positions indicated at 51. The two operating bars are preferably operated successively. In rotating the shaft in the manner described, the crank arms 59—59 at opposite ends thereof are swung in the arc of a circle, thereby causing swinging movement of the crank arms 55 at the inner ends of the crank members R—R. Due to the crank pins 60—60 of the arms 59—59 working in the slots 57—57 of the arms 55—55, a lost motion connection is provided, whereby power multiplying action is had during the initial movement of the parts while the door is being opened. As will be evident, great force is thus applied by the operating means during the initial portion of the door opening operation. The operating levers K—K are latched to the bracket 50 when the door has been fully opened so as to lock the parts against movement while the door is being slid away from the door opening. In closing the door, the operation is the reverse to that hereinbefore described.

Referring next to the embodiment of the invention illustrated in Figure 12, the same comprises a combination of certain parts of both the mechanism shown in Figures 1 to 6 inclusive and Figures 7 to 11 inclusive.

In carrying out the invention as shown in Figure 12, I employ top and bottom tracks A—A, identical with the tracks A—A hereinbefore described, with the exception that the left hand end of the top track A terminates short of the lower track A. As shown in Figure 12, the mechanism includes a vertically disposed operating bar W having end castings at the top and bottom ends thereof, the end casting at the upper end being identical with the upper end casting T of the left hand bar shown in Figure 7 and being also indicated by T. The end casting at the lower end of the bar is also identical with the end casting F at the lower end of the bar E in Figure 1 and is also indicated by F. The mechanism at the bottom section of the door is all identical with that shown at the bottom section of the door in Figure 1, and the elements thereof are designated by the corresponding reference characters in Figure 12. This mechanism comprises the carrier B, crank members D—D, and the connecting bar G. The opposite ends of the bar G are connected to the crank arms 35—35 at the upper ends of the crank members D—D by crank pins 37—37 and the bar G is operated by means of the crank member 41 of the lower end casting F, which crank member has the pin 42 thereof working in a slot 44, which is of the same design and construction as the corresponding part of the mechanism shown in Figures 1 and 3. The journal portion of the end member F at the lower end of the bar W and the journal portions of the crank members D—D are supported by bearing brackets H and C—C, identical with the brackets H and C—C of Figures 1 to 6 inclusive. The upper crank member R has the crank pin 56 of the crank arm 54 thereof journaled in the single carrier N, which cooperates with the upper track A. The crank arm 55 at the inner end of the crank member R has a slot 57 within which the pin 60 of the crank arm 59 of the end member T engages. The locking member L and the latch bracket M, similar to the corresponding elements in Figure 1, are also employed to hold the operating lever K in the full and dotted line positions indicated in Figure 12.

In opening the door, the lever K is swung from the full line position to the dotted line position shown in Figure 12, thereby rotating the bar W and the crank arms 41 and 59 at opposite ends thereof. The bar G is reciprocated by the lower crank arm 41 so as to oscillate the crank member D, while the upper crank arm 59 causes swinging movement of the crank arm 57 and the crank member R. Through the operation described, the door is forced fully open. The closing operation is the reverse of that described.

Referring to the embodiment of the invention illustrated in Figures 13, 14 and 15, the car wall 20 has tracks mounted thereon above and below the door opening 21, these tracks being identical with the tracks A—A hereinbefore described and being also designated by A—A. In Figure 13, the left hand end portion only of the door 22 is shown, the single operating mechanism at that end of the door being illustrated in detail. It will be understood that this mechanism is duplicated at opposite ends of the door in a manner similar to the mechanism disclosed in Figure 7. As clearly shown in Figure 13, the mechanism comprises a vertically disposed operating bar S, identical with the bar S shown at the left hand side of Figure 7; and castings T'—T' at the top and bottom end of the bar S; crank members R'—R' operatively connected to the end members; and top and bottom carriers N—N, identical with the corresponding carriers N—N shown in Figure 7. The bar S is rotated by an operating lever K, identical with the lever K hereinbefore described, and pivoted to the lower end casting T' in a similar manner. The crank members R'—R' are of similar design, each comprising a vertically disposed shaft section 70, a radially extending crank arm 71 at the outer end of the shaft 70, and a crank pin 72 at the end of the crank arm 71, said crank pin rotating in the journal opening of the corresponding carrier N. The end members T'—T' at the upper and lower ends of the operating bars S are also of like design each having a shaft section 73 provided with a crank arm 74 at the outer end having a crank pin 75 at its extremity working within a slot 76 in the crank arm 71 of the corresponding crank member R'. The slot 76, as most clearly shown in Figure 15, is arranged in the crank arm 71 between the end which carries the shaft section 70 and the opposite end which carries the pin 72. The shaft section 70 of the crank member R' and the shaft section 73 of the corresponding end casting T' are journaled in a bearing bracket 77 which is fixed to the door in any suitable manner. The bearing brackets 77 are four in number, two being employed in connection with each operating means and being disposed at the top and bottom of the corresponding end of the door 22. Each bracket 77 is preferably of two-part design having a partial bearing opening in each part, as clearly shown in Figure 14. The inner end of the shaft section 70 of each crank member R' is headed as indicated at 78, thereby preventing accidental displacement of the crank member R'.

The operation of the improvements shown in Figures 13, 14, and 15 is as follows:

In opening the door, the bar S is rotated through swinging the lever K, thereby rotating the crank arms 74—74 and causing swinging movement of the crank pins 75—75 which are engaged within the slots 76—76 of the crank arms 71 of the crank members R'. The crank members R' are thus swung to a sufficient extent to force the door fully open. In closing the door, the operation is the reverse of that just described. The relation of the slots 76—76 of the crank arms 71—71 to the cooperating cranks 74—74 and crank pin members 75—75 of the bar S is such that a power multiplying action is had during the initial opening and final closing movements of the door.

I have herein shown and described what I now consider the preferred manner of carrying out my invention, but the same is merely illustrative and I contemplate all changes and modifications that come within the scope of the claims appended hereto.

I claim:

1. In a door construction for refrigerator cars having a wall member provided with a door opening, the combination with a door adapted to close said opening; of guide tracks on said wall member above and below said door opening; a carrier slidably guided on each track; top and bottom crank members mounted on the door for rotation about vertically aligned axes; a crank arm on each crank member having a crank pin at the outer end journaled in the corresponding carrier; an operating shaft on said door rotatable about a vertical axis fixed with respect to the aligned axes of rotation of said crank members; and power multiplying motion reducing connections between said rotary operating shaft and said crank members for rotating said crank members through an angle which is less than the angular rotation of said operating shaft.

2. In a door construction for refrigerator cars having a wall member provided with a door opening, the combination with a door adapted to close said door opening; of tracks on said wall member above and below said door opening; a carrier slidably guided on each track; crank arms at the top and bottom of the door having their outer ends pivoted on said carriers and having their inner ends rotatable about vertically aligned axes; a rotary operating shaft mounted on the door for rotation about a vertical axis fixed with respect to the vertically aligned axes of said crank arms; and power multiplying motion reducing connections between said rotary operating shaft and said crank arms for rotating said crank arms through an angle less than the angular rotation of said operating shaft.

3. In a door construction for refrigerator cars having a wall member provided with a door opening, the combination with a door for closing said door opening; of tracks on said wall member above and below said door opening; a carrier slidably guided on each track; crank shafts mounted on the door; crank arms extending radially from said shafts and having their outer ends rotatably journaled on said carriers; an operating shaft mounted on said door, said crank shafts and operating shaft being rotatable about parallel axes fixed with respect to each other; and power multiplying motion reducing connections between said rotary operating shaft and crank shafts for rotating said crank shafts through an angle less than the angular rotation of said operating shaft.

4. In a door construction for refrigerator cars having a wall member provided with a door opening, the combination with a door for closing said opening; of tracks on said wall member above and below said door opening; a carrier slidably guided on each track; crank arms at the top and bottom of the door, mounted for rotation on axes fixed with respect to the door; pivot means at the outer ends of said crank arms rotatably supported on said carriers; an operating shaft mounted on the door for rotation about an axis offset with respect to said axes of rotation of the crank arms, said axis of rotation of said shaft being fixed with respect to the axes of rotation of said crank arms; and power multiplying motion reducing connections between said rotary operating shaft and crank arms for rotating said crank arms through an angle less than the angular rotation of said operating shaft.

5. In a door construction for refrigerator cars having a wall member provided with a door opening, the combination with a door adapted to close said opening; of a track on said wall member; a carrier slidable on said track; means including a slotted element for moving said door toward and away from the door opening; and a rotatable shaft having a crank arm thereon provided with a crank pin at its outer end working in the slot of said element to effect movement of said means to actuate the door, said shaft being rotatable about an axis fixed with respect to the door.

6. In a door construction for refrigerator cars having a wall member provided with a door opening, the combination with a door adapted to close said opening; of a guide track on said wall member adjacent to said door opening; a single carrier slidably guided on said track; a pair of crank shafts mounted on said door for rotation about parallel axes; a radial arm on each shaft having its outer end journaled in said carrier, said arms being swingable in parallel relation; and a rotary operating shaft connected to both crank members for swinging the same in unison.

7. In a door construction for refrigerator cars having a wall member provided with a door opening, the combination with a door adapted to close said opening; of guide tracks on said wall member above and below said door opening; a pair of carriers slidable in the guide track above said opening; a single carrier slidable in the guide track below said opening; a pair of crank shafts at the top of said door having radial crank arms thereon, the outer ends of said arms being pivotally connected respectively to said pair of carriers; a pair of crank shafts at the bottom of said door having radial crank arms thereon, the outer ends of said arms being pivotally supported on said single carrier; means connecting each pair of crank arms for rotating the same in unison; and a single rotary operating shaft on said door for operating both of said connecting means.

8. In a door construction for refrigerator cars having a wall member provided with a door opening, the combination with a door adapted to close said door opening; of a guide track on said wall member adjacent to said door opening; carrier means slidable on said guide track; a pair of crank shafts rotatably mounted on the door, each shaft having radial crank arms at the inner and outer ends thereof; crank pins at the outer end of each arm, the crank pins of the outer arms being journaled on said carrier means; a bar having its opposite ends connected to the crank pins of the inner arms; a rotary operating shaft mounted on the door; and a crank arm on said shaft, said arm having a crank pin at its outer end operatively connected to said bar.

9. In a door construction for refrigerator cars having a wall member provided with a door opening, the combination with a door for closing said opening; of a guide track on said wall member adjacent to said door opening; carrier means slidable on said guide track; a pair of short shafts rotatably mounted on the door, each shaft having radial crank arms at the inner and outer ends thereof; means pivotally connecting the outer crank arms to said carrier; a bar having its opposite ends pivotally connected to the ends of the inner crank arms; a rotary operating shaft on the door; and an eccentric lost motion connection between said shaft and bar for actuating the bar.

10. In a door construction for refrigerator cars having a wall member provided with a door opening, the combination with a door for closing said opening; of a guide track on said wall member adjacent to said door opening; carrier means slidable on said guide track; a pair of door supporting members journaled on said door for rotation about parallel axes, each supporting member having a relatively long crank arm at one end and a relatively short crank arm at the other end, said long crank arms having their outer ends pivoted on said carrier means; a bar operatively connecting said short crank arms, said bar being provided with a slot at right angles to its length; an operating bar mounted on the door for rotation on an axis parallel to said axes of rotation of said supporting members; and a radial crank arm on said rotary operating bar having a crank pin at its outer end guided in the slot of said connecting bar.

11. In a door construction for refrigerator cars having a wall member provided with a door opening, the combination with a door for closing said opening; of guide tracks on said wall member above and below said door opening; carrier means slidably guided on each track; pairs of crank members at the top and bottom of the door, each crank member having crank arms at the inner and outer ends thereof, the outer crank arms of said top and bottom crank members having their outer ends swiveled to said carrier means respectively; top and bottom bars connecting the inner crank arms of said top and bottom pair of crank members, each of said bars having a guide slot at right angles to its length; a rotary operating shaft mounted on the door, said shaft having radially extending crank arms at opposite ends, said arms having crank pins at their outer ends guided in said slots of the bars.

12. In a door construction for refrigerator cars having a wall member provided with a door opening, the combination with a door for closing said opening; of a guide track on said wall member adjacent to said door opening; carrier means slidably guided on said track; a crank member rotatably supported on the door, said crank member having crank arms at the inner and outer ends thereof, the outer crank arm having a pivotal connection with the carrier means and said inner crank arm being slotted; an operating bar rotatably supported on the door, said crank member and operating bar being rotatable about axes fixed with respect to each other and the door; an eccentric crank pin on said operating bar, said pin extending into and being guided within the slot of said inner crank arm of the crank member.

13. In a door construction for refrigerator cars having a wall member provided with a door opening, the combination with a door for closing said opening; of guide tracks on said wall member above and below said door opening; carrier means slidably guided on each track; crank members at the top and bottom of the door journaled on said door for rotation about vertical axes fixed with respect to the door, each of said crank members having radially extending crank arms at the inner and outer ends thereof, said outer crank arms being rotatably supported at their outer ends on said top and bottom carrier means said inner crank arms having outwardly extending guide slots therein; a vertically disposed operating bar rotatable about a vertical axis fixed with respect to the door; radial crank arms at opposite ends of said bar; and crank pins at the outer ends of said last named arms engaging within the guide slots of said inner crank arms.

14. In a door construction for refrigerator cars having a wall member provided with a door opening, the combination with a door for closing said opening; of guide tracks on said wall member above and below said door opening; a pair of carriers slidably guided on each track; pairs of crank members at the top and bottom of the door, the members of each pair being mounted at opposite ends of the door for rotation about parallel axes; crank arms at the inner and outer ends of each crank member, the outer arms of each pair of crank members being pivoted on the corresponding pair of carriers, and the inner arm of each crank member being slotted; a pair of rotary operating shafts at opposite ends of the door; radial crank arms at opposite ends of each shaft having crank pins at the outer ends thereof operatively guided within the slots of the inner arms of the top and bottom crank members at the corresponding end of the door.

15. In a door construction for refrigerator cars having a wall member provided with a door opening, the combination with a door for closing said opening; of guide tracks on said wall member above and below said door opening; a carrier slidably guided on each track; an upper crank member at the top of the door; a pair of lower crank members at the bottom of the door, all of said crank members being rotatably supported on the door; radial crank arms at the inner and outer ends of each crank member, the outer end of the outer crank arm of said upper crank member being swingingly supported on said upper carrier, the inner crank arm of said last named crank member having an outwardly extending guide slot therein, the outer ends of the outer arms of said pair of lower crank members being swingingly supported on said lower carrier; a connecting bar having its opposite ends swiveled to the outer ends of the inner arms of said last named crank members, said bar having a guide slot therein at right angles to its length; a rotary operating bar supported on the door; crank arms at opposite ends of said bar; and crank pins at the outer ends of said last named crank arms, respectively engaged within the slot of said inner crank arm of the upper crank member and the slot of said connecting bar.

16. In a door construction for refrigerator cars having a wall member provided with a door opening, the combination with a door for closing said opening; of a guide track on said wall member adjacent to the door opening; a carrier slidably guided on said track; a crank member rotatably supported on the door, said crank member having a radially disposed arm thereon, said arm having its outer end pivotally connected to the carrier; a guideway in said arm; a rotary operating bar mounted on the door; and an eccentric crank pin on said bar working in the guideway of said arm.

17. In a door construction for refrigerator cars having a wall member provided with a door opening, the combination with a door for closing said opening; of a guide track on said wall member adjacent to said opening; a carrier slidably guided on said track; a crank shaft rotatably mounted on the door; a rotary operating shaft on the door arranged parallel to said crank shaft; a radially extending crank arm at the outer end of said crank shaft; a crank pin at the outer end of said arm journaled in said carrier, said arm having a guide slot between said crank pin and the axis of rotation of the crank shaft; and eccentric crank pin means on said operating shaft engaged in the guide slot of said crank arm.

18. In a door construction for refrigerator cars having a wall member provided with a door opening, the combination with a door for closing said opening; of guide tracks on said wall member above and below said door opening; a set of top and bottom carriers at each end of the door slidingly guided on said top and bottom guide tracks; a vertically disposed rotary operating bar mounted on the door; eccentric crank pin means at each end of the bar; a crank shaft journaled on said door adjacent to each end of said bar; a radially extending crank arm at the outer end of each crank shaft, each of said arms having a slot within which the eccentric crank pin means at the corresponding end of said bar is engaged; and means for pivotally connecting the outer end of each of said crank arms to the corresponding carrier.

19. In a door construction for refrigerator cars having a wall member provided with a door opening, the combination with a door for closing said opening; of guide tracks above and below said door opening; carrier means slidably guided on each track; crank arms at the top and bottom of the door, each crank arm being swingingly connected at opposite ends to said door and the corresponding carrier, each of said crank arms having a guide slot between the ends thereof, the slot of each arm extending lengthwise of said arm; a vertically disposed rotary operating shaft on said door for actuating said top and bottom crank arms; a radial arm at each end of said operating shaft; and a trunnion at the outer end of each of said radial arms engaging within the guide slot of the corresponding crank arm.

20. In a door construction for refrigerator cars having a wall member provided with a door opening, the combination with a single door adapted to close said opening; of guide tracks on said wall member above and below said door opening; a carrier slidably guided on each track; operating members at the top and bottom of said door journaled on said door for rotation about vertically aligned axes; a crank arm on each operating member having the outer end journaled in the corresponding carrier; rotary actuating means on the door; and power multiplying, motion reducing connections between said rotary actuating means and operating member for transmitting the motion from said rotary means to said operating members to rotate said crank arms through an angle which is less than the angular rotation of said actuating means.

21. In a door construction for refrigerator cars having a wall member provided with a door opening, the combination with a single door adapted to close said opening; of guide tracks on said wall member above and below said door opening; a carrier slidably guided on each track; operating members at the top and bottom of said door journaled on said door for rotation about vertically aligned axes; a crank arm on each operating member having the outer end journaled on the corresponding carrier; rotary actuating means on the door; and power multiplying, progressively ratio changing, motion reducing connections between said rotary actuating means and the operating member for transmitting the motion from said rotary actuating means to said operating members to rotate said crank arms through an angle which is less than the angular rotation of said actuating means to either withdraw the door from said door opening or force the door into said opening, the motion reducing ratio of said connections being greatest during the initial opening and final closing movements of the door.

22. In a door construction for refrigerator cars having a wall member provided with a door opening, the combination with a single door adapted to close said opening; of guide tracks on said wall member above and below said door opening; a carrier slidably guided on each track; operating members at the top and bottom of the door, journaled on said door for rotation about vertically aligned axes; a crank arm at the outer end of each operating member having its outer end journaled in the corresponding carrier; a relatively short crank arm at the inner end of each operating member, said last named crank arm having a bearing opening at its outer end; top and bottom supporting brackets on the door having vertically aligned bearing openings; a rotary actuating member provided with a set of axially aligned cylindrical journal portions, said portions being located at opposite ends of said member and being rotatable in the bearing openings of said brackets; and top and bottom crank arms on said actuating member, said arms being provided with a set of axially aligned cylindrical journal portions, said last named portions being at the outer ends of said arms and rotatable in the bearing openings of the crank arms which are located at the inner ends of the operating members, one of said sets of cylindrical bearing portions having sliding movement in the cooperating bearing openings.

23. In a door construction for refrigerator cars having a wall member provided with a door opening, the combination with a single door adapted to close said opening; of guide tracks on said wall member above and below said door opening; a carrier slidably guided on each track; operating members at the top and bottom of said door, each operating member comprising a relatively short shaft, an elongated crank arm at the outer end of the shaft, and a relatively shorter crank arm at the inner end of the shaft bearing means at the outer ends of said elongated crank arms, journaled on said carriers, each of said short arms having a bearing slot at the outer end; a rotary actuating bar on the door; top and bottom bearing brackets on the door rotatively supporting said bar; crank arms at opposite ends of said bar; crank pins at the outer ends of said last named arms having both rotary and sliding movement in the slots of the short arms of the operating members.

24. In a door operating mechanism, the combination with rotatable crank members at the top and bottom of the door for forcing said door inwardly or outwardly, said crank members being journaled on the door for rotation about vertically aligned axes; of means for rotating said crank members including a rotary actuating member, and motion transmitting, power multiplying, rotation reducing connections between said rotary actuating member and rotary crank members.

25. In a door operating mechanism, the combination with rotatable crank members journaled on the door for rotation about vertically aligned axes, said crank members operating to move the door inwardly or outwardly; of a vertically disposed rotary bar on the door; and motion transmitting, power multiplying, progressively ratio changing, rotation reducing connections between said rotary bar and said cranks for transmitting rotary motion from said bar to said cranks to rotate the latter through an angle which is less than the angular rotation of said bar.

26. In a mechanism for forcing a door into and withdrawing the same from a door opening, the combination with means for supporting the door for movement toward and away from said opening, comprising a rotary member journaled on the door and having a crank arm; of a rotary actuating shaft on the door; a crank arm on said shaft; and means operatively connecting said crank arms, including a crank pin on one of said arms working in a guideway on the other arm.

27. In a mechanism for forcing a door into and withdrawing the same from a door opening, the combination with means for guiding the door for movement toward and away from said opening, including a rotary member having a radial arm slotted at its outer end; of a rotary actuating shaft mounted on the door; a crank arm on said shaft; and a crank pin at the outer end of said crank arm guided in the slot of said radial arm.

STACY B. HASELTINE.